United States Patent
Mukoyama et al.

(10) Patent No.: US 9,931,793 B2
(45) Date of Patent: Apr. 3, 2018

(54) PROCESS OF PRODUCING HEATING ELEMENT

(71) Applicant: Konica Minolta, Inc., Tokyo (JP)

(72) Inventors: Izumi Mukoyama, Tokyo (JP); Junji Ujihara, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/154,425

(22) Filed: May 13, 2016

(65) Prior Publication Data

US 2016/0250811 A1 Sep. 1, 2016

Related U.S. Application Data

(63) Continuation of application No. 14/858,660, filed on Sep. 18, 2015, now abandoned.

(30) Foreign Application Priority Data

Sep. 25, 2014 (JP) .................................. 2014-195014

(51) Int. Cl.
| | |
|---|---|
| G03G 15/20 | (2006.01) |
| B29C 70/20 | (2006.01) |
| B29C 70/88 | (2006.01) |
| H05B 3/34 | (2006.01) |
| H05B 3/56 | (2006.01) |

(Continued)

(52) U.S. Cl.
CPC ............ B29C 70/20 (2013.01); B29C 70/882 (2013.01); G03G 15/2057 (2013.01); H05B 3/34 (2013.01); H05B 3/565 (2013.01); B29K 2105/08 (2013.01); B29K 2995/0016 (2013.01); B29L 2031/779 (2013.01); G03G 2215/2025 (2013.01)

(58) Field of Classification Search
CPC .... G03G 15/2057; H05B 1/0241; H05B 3/18; H05B 3/48
See application file for complete search history.

(56) References Cited

U.S. PATENT DOCUMENTS

| | | | | |
|---|---|---|---|---|
| 5,492,573 A | * | 2/1996 | Fukushima | ............. C22C 38/26 148/325 |
| 5,619,315 A | | 4/1997 | Kusumoto | |
| 2011/0300368 A1 | | 12/2011 | Qi | |

(Continued)

FOREIGN PATENT DOCUMENTS

| | | |
|---|---|---|
| JP | 2012008299 A | 1/2012 |
| JP | 2012-037879 A | 2/2012 |

(Continued)

OTHER PUBLICATIONS

Notice of Reasons for Rejection dated Nov. 8, 2016 from corresponding Japanese Application; Japanese Patent Application No. 2014-195014; English translation of Notice of Reasons for Rejection; Total of 6 pages.

*Primary Examiner* — Clayton E Laballe
*Assistant Examiner* — Ruifeng Pu
(74) *Attorney, Agent, or Firm* — Lucas & Mercanti, LLP

(57) ABSTRACT

An endless-belt shaped heating element is produced by: dispersing annealed stainless-steel fibers in the heat-resistant resin or a precursor thereof; and, producing a molded article of the heat-resistant resin in which the annealed stainless-steel fibers are dispersed.

20 Claims, 4 Drawing Sheets

(51) Int. Cl.
    *B29K 105/08*    (2006.01)
    *B29L 31/00*    (2006.01)

(56) References Cited

U.S. PATENT DOCUMENTS

| | | |
|---|---|---|
| 2011/0318077 A1 | 12/2011 | Mukoyama et al. |
| 2012/0051810 A1 | 3/2012 | Yoshida |
| 2013/0045034 A1 | 2/2013 | Yoshida |
| 2013/0149439 A1 | 6/2013 | Ujihara |
| 2013/0279932 A1 | 10/2013 | Ishigai |
| 2014/0079454 A1 | 3/2014 | Mukoyama |
| 2015/0212467 A1 | 7/2015 | Mukoyama |

FOREIGN PATENT DOCUMENTS

| | | |
|---|---|---|
| JP | 2013025120 A | 2/2013 |
| JP | 2013037213 A | 2/2013 |
| JP | 2013054291 A | 3/2013 |
| JP | 2014-044378 A | 3/2014 |

\* cited by examiner

PROCESS OF PRODUCING HEATING ELEMENT

CROSS REFERENCE TO RELATED APPLICATIONS

This application is a continuation application of U.S. patent application Ser. No. 14/858,660, filed Sep. 18, 2015, which claimed the benefit of Japanese Patent Application No. 2014-195014, filed on Sep. 25, 2014, the disclosure of each application including the specification, drawings and abstract are incorporated herein by reference in its entirety.

BACKGROUND OF THE INVENTION

Field of the Invention

The present invention relates to a process of producing a heating element.

Description of Related Art

Thermal-film fixation type fixing devices are known as fixing devices employed in image forming apparatuses such as copiers and laser beam printers. Such fixing devices can shorten a time from turn-on to copy start (warming-up time), and are advantageous in terms of energy saving.

The fixing devices include a heating belt (heating element) that generates heat in response to supply of electricity to the heating belt. The heating belt is, for example, a seamless belt including a film made of a heat-resistant resin such as polyimide and a releasing layer made of fluororesin or the like that covers the outer peripheral surface of the film. As such a heating belt, a belt is known in which a belt-shaped substrate comprising the heat-resistant resin contains conductive fibrous fillers that satisfy a certain condition for the purpose of reducing the resistance of the heating belt or increasing the stability of the resistance (see, for example, Japanese Patent Application Laid-Open Nos. 2012-8299 and 2013-25120).

The heating belt disclosed in Japanese Patent Application Laid-Open No. 2012-8299 can sufficiently reduce the initial resistance value thereof. In addition, the heating belt disclosed in Japanese Patent Application Laid-Open No. 2013-25120 can provide a high resistance stability in comparison with conventional belts. However, the resistance value may increase with time even when these heating belts are used, and utilization of the heating belts in the fixing device of an image forming apparatus may result in uneven fixing due to changes in resistance value in the heating belt.

SUMMARY OF THE INVENTION

An object of the present invention is to provide a heating element whose resistance value is stable for a long period of time.

At least to achieve the object, the present invention provides a process for producing a heating element which includes: dispersing a stainless-steel fiber subjected to annealing treatment in a heat-resistant resin or a precursor of the heat-resistant resin; and producing a molded article of the heat-resistant resin in which the stainless-steel fiber is dispersed.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
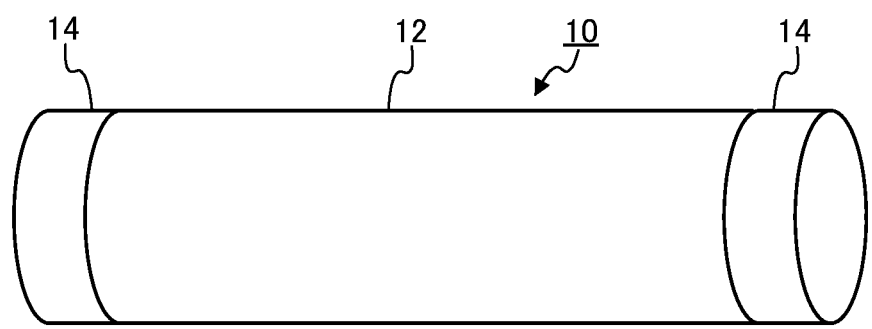
FIG. 1 schematically illustrates an example of a heating element according to an embodiment of the present invention.

In the following, an embodiment of the present invention is described.

[Heating Element]

A heating element according to the present embodiment includes an article comprising a heat-resistant resin, and annealed stainless-steel fibers dispersed in the article. The "heating element" generates heat in response to electrification. The configuration of the heating element (article) is not limited, and for example, the heating element is a sheet, an endless belt, or the like. The heating value of the heating element can be set by the amount of electrification, the content of the annealed stainless-steel fibers or the like, and can be increased by increasing the amount of electrification, the content of the annealed stainless-steel fibers or the like.

Examples of the heat-resistant resin include polyphenylene sulfide, polyarylate, polysulfone, polyethersulfone, polyetherimide, polyimide, polyamideimide and polyetheretherketone, and these resins may be used alone or in combination. Among them, polyimide is preferable in view of heat-resistance.

Polyimide can be obtained by proceeding dehydration-cyclization (imidization) reaction of polyamic acid that is a precursor of polyimide by heating at 200° C. or above or by using a catalyst. In view of this, when polyimide is used as a heat-resistant resin, it is preferable that polyamic acid and a stainless-steel fiber be mixed and thereafter heated at a temperature of 200° C. or above, for example. Polyamic acid may be produced through a polycondensation reaction caused by mixing and heating a solvent in which tetracarboxylic dianhydride and a diamine compound are dissolved. Alternatively, a commercially available polyamic acid may be used. Examples of the diamine compound and tetra carboxylic dianhydride include the compounds disclosed in Japanese Patent Application Laid-Open No. 2013-25120 (paragraphs 0123 to 0130).

The content of the heat-resistant resin in the heating element is preferably 40 to 90 vol. % in view of formability and the like.

One or more different annealed stainless steel fibers may be used. Examples of the stainless steel of the stainless-steel fibers include austenitic stainless steels, martensitic stainless steels, ferritic stainless steels, austenite ferritic stainless steels, and precipitation-hardening type stainless steels. Examples of the austenitic stainless steels include SUS201, SUS202, SUS301, SUS302, SUS303, SUS304, SUS305, SUS316 and SUS317. Examples of the martensitic stainless steels include SUS403 and SUS420. Examples of the ferritic stainless steels include SUS405, SUS430 and SUS430LX. Examples of the austenite ferritic stainless steels include SUS329J1. Examples of the precipitation-hardening type stainless steels include SUS630. Among them, in view of preventing oxidation, austenitic stainless steels and ferritic stainless steels are preferable.

The ratio (1/L) of the minor axis (fiber sectional size; 1) to the major axis (fiber length; L) of the stainless-steel fibers is 0.25 or smaller, for example. More preferably, the ratio 1/L is 0.025 to 0.25. Preferably, major axis L of the stainless-steel fibers is 5 to 1000 μm, more preferably, 10 to 200 μm. Preferably, minor axis 1 of the stainless-steel fibers is 0.5 to 30 μm, more preferably, 1 to 10 μm. It is to be noted that the "fiber sectional size" means the major axis of the fiber as viewed in cross section, and when the fiber has a circular shape as viewed in cross section, the "fiber sectional size" is the diameter of the circular shape.

The major axis and the minor axis of the stainless-steel fibers are each an average value of the values that are measured from an image such as a microphotograph. For example, the major axis and the minor axis are measured in the following manner. Specifically, first, the stainless-steel fibers are imaged at ×500 magnification by scanning-electron microphotography, and an image thus obtained is taken into a scanner. Then the major axes and the minor axes of 500 samples of the stainless-steel fibers extracted from image data obtained by the manner are measured to calculate the average value thereof.

The stainless-steel fibers may be produced stainless-steel fibers, or commercially available stainless-steel fibers. For example, the stainless-steel fibers are produced by publicly known manufacturing methods. The stainless-steel fibers are produced in the following manner. Specifically, a stainless steel is pulled out from nozzles into a fibrous form, and then further extended and/or heated as necessary. Thus, stainless-steel fibers having a desired minor axis are produced, and then the fibers are cut into a desired length.

The annealed stainless-steel fibers are stainless-steel fibers that have been subjected to annealing treatment. "Annealing treatment" is thermal treatment for removing internal strain of the stainless-steel fibers resulting from processing and hardening. With the annealing treatment, the texture of each of the stainless-steel fibers is hardened, and the ductility of each of the stainless-steel fibers is improved. During the annealing treatment, for example, the stainless-steel fibers are heated for 4 to 10 hours under a nitrogen atmosphere such that the stainless-steel fibers have a temperature (treatment temperature) of 500 to 600° C. When the treatment temperature is lower than 500° C., the internal strain may not be sufficiently removed, and when the treatment temperature is higher than 600° C., a passivation film, which will be described later, on the surface of each of the stainless-steel fibers may be destroyed.

The annealed stainless-steel fibers can be distinguished by detecting characteristic changes caused by annealing. For example, when a stainless-steel fiber is subjected to annealing, the lattice defects of the metal texture of the stainless-steel fiber are reduced, recrystallization is caused, and the texture is uniformized, and as a result, the internal strain is substantially removed, thus substantially eliminating the internal stress (residual stress). This change in the stainless-steel fiber caused by annealing is irreversible. Therefore, it is possible to determine whether stainless-steel fibers dispersed in the article of the heat-resistant resin are the annealed stainless-steel fibers, by observing the texture of the stainless-steel fibers with a metal microscope, or by observing their uniformity and characteristic changes resulting from annealing in cross section, or, by observing changes of the texture before and after the annealing treatment of a sample of the stainless-steel fiber in the heating element, for example.

The stainless-steel fibers may further include a coating. Preferably, the coating is an oxidation-preventing coating that prevents oxidation. For example, in view of providing the heating element with a stable resistance at high temperatures, the coating is preferably a film comprising an oxide of at least one of Cr, Mo, Cu, and Si, or a composite oxide of Cr, Mo, Cu, and Si. More preferably, the coating is a chromium oxide coating. While the oxidation-preventing coating may cover substantially the entire stainless-steel fiber or a part of the stainless-steel fiber, the oxidation-preventing coating preferably covers substantially the entire stainless-steel fiber.

The oxidation-preventing coating can be produced by a method (1) in which the stainless-steel fibers are immersed in a solution of a material of the oxidation-preventing coating; a method (2) in which the stainless-steel fibers are heated at low temperatures in oxygen or clean air; or a method (3) in which the stainless-steel fibers are anode-polarized in a solution of an oxidant. In view of uniformity of the resultant oxidation-preventing coating, the method (1) is preferable.

The material of the oxidation-preventing coating is a commonly-used oxidant, for example, and examples of such a material include nitric acid, sulfuric acid, phosphoric acid, chromic acid and dichromic acid. The method (1) can produce a coating comprising various oxides (composite oxide) of Cr, Ni, Ti, Mo, Al, Si and the like.

In view of providing the heating element with an appropriate strength, toughness, conductivity and the like, the content of the annealed stainless-steel fibers in the heating element is preferably 10 to 60 volume %, more preferably 15 to 45 volume %.

The heating element may further include other components in addition to the heat-resistant resin and the annealed stainless-steel fibers as long as the effect of the present embodiment can be achieved. Examples of the other components include conductive materials other than the annealed stainless-steel fiber dispersed in the article of the heat-resistant resin, electrodes, and other layers such as a releasing layer.

The conductive materials may be used alone or in combination. Examples of the conductive material include pure metals such as gold, silver, iron, and aluminum, alloys such as stainless steel (SUS) and Nichrome, and non-metals such as carbon and graphite. The form of the conductive material is not limited, and for example, the conductive material may be provided in a form of spherical powder, unshaped powder, flat powder or fiber.

As the electrode, two or more electrodes are disposed in the heating element. In view of efficiently supplying electricity for desired heat generation, a pair of electrodes is disposed at opposite end portions (both end edges) of the heating element. Examples of the electrode include a metal thin plate, a ring formed of a rounded metal thin plate, and a solidified material of a conductive paste. The electrode formed of a metal thin plate is bonded on the surface of the heating element with a conductive adhesive agent for example. Examples of the electrode material include iron, nickel, and stainless steels such as SUS430. Examples of the conductive adhesive agent include a composition containing a bonding preform such as epoxy resin and the above-described conductive material, and silane coupling agent. Example of the silane coupling agent includes alkylamino-trialkoxysilane.

Examples of the other layers include a releasing layer, an elastic layer and a reinforcement layer. The releasing layer is a layer having releasability, which is disposed on the surface of the article of the heating element. Examples of the material of the releasing layer include polyethylene, polypropylene, polystyrene, polyisobutylene, polyester, polyurethane, polyamide, polyimide, polyamide imide, alcohol-soluble nylon, polycarbonate, polyarylate, phenol, polyoxymethylene, polyetheretherketone, polyphosphazene, polysulfone, polyether sulfide, polyphenylene oxide, polyphenylene ether, polyparabanic acid, polyallylphenol, fluororesin, polyurea, ionomer, silicone, and mixture or copolymer thereof. The releasing layer has a thickness of 5 to 20 µm, for example.

The elastic layer is a layer having elasticity, and is disposed between the article and the releasing layer for example. Examples of the material of the elastic layer include silicone rubber, thermoplastic elastomer and rubber materials. In view of sufficiently ensuring thermal conductivity and elasticity, the thickness of the elastic layer is set to 5 to 300 µm, for example.

The reinforcement layer is a layer intended to increase the mechanical strength of the heating element, and is disposed on the surface opposite to the releasing layer and the elastic layer in the article. The reinforcement layer may be formed of the above-described heat-resistant resin, and may have any thickness.

The heating element has a configuration in which the annealed stainless-steel fibers are dispersed in the article of the heat-resistant resin, and thus the heating element can provide excellent dimensional stability under high temperature environments. The dimensional stability is appropriately set in accordance with the use of the heating element. Preferably, the heating element satisfies Expression (1) in view of limiting uneven fixing of a formed image in the case where the heating element is used as the heating belt of a fixing device of an electrophotographic image forming apparatus, for example:

$$\{(L1-L0)/L0\} \leq |0.0002| \tag{1}$$

where L0 represents the size of the heating element in the initial state and L1 represents the size of the heating element left at a temperature of 200° C. for one week.

When the absolute value of the $\{(L1-L0)/L0\}$ is greater than 0.0002, visually-recognizable uneven fixing may occur in an image such as a solid image. The absolute value of the $\{(L1-L0)/L0\}$ can be set to 0.0002 or smaller by sufficiently subjecting the stainless-steel fibers to annealing treatment under the above-described condition, for example.

The heating value of the heating element may be appropriately set in accordance with its use, and in view of this, its resistance value may be appropriately set (in further consideration of the amount of electrification in the use, for example). For example, the heating element preferably has a volume resistivity of $0.08 \times 10^{-4}$ to $10.00 \times 10^{-4}$ Ωcm, in view of ensuring efficient heat generation of the heating belt. The volume resistivity is determined from, in the case where a current is caused to flow through a portion between two electrodes disposed in the heating element, the cross-sectional area of the portion, the amount of the current, and the potential difference between the two electrodes.

In addition, the heating element is excellent in dimensional stability at high temperatures, and is therefore excellent in stability of the resistivity at high temperatures. The stability of the resistivity is appropriately set in accordance with the use of the heating element. Preferably, the heating element satisfies Expression (2) in view of limiting the uneven fixing, for example:

$$|1 \leq (\rho s1/\rho s0) \leq 1.03 \tag{2}$$

where ρs0 represents the resistance value (Ω) of the heating element in the initial state, and ρsi represents the resistance value (Ω) of the heating element left under an environment of 180° C. and 50RH % for one week.

When the ratio ρs1/ρs0 falls outside the range, visually-recognizable uneven fixing may occur in a solid image. The ratio ρs1/ρs0 can be adjusted to fall within the range by sufficiently subjecting the stainless-steel fibers to annealing treatment under the above-described condition, for example.

Except that the annealed stainless-steel fibers are used as a conductive material, the heating element may be produced using typical methods for producing the heating belt. For example, the heating element may be produced by a method including a step of dispersing the annealed stainless-steel fibers in the heat-resistant resin or their precursor, and a step of producing a molded article of the heat-resistant resin in which the annealed stainless-steel fibers are dispersed. The molded article of the heat-resistant resin may be produced by deposition (drying) of the heat-resistant resin from the solution, or production of a heat-resistant resin through the reaction of the precursor, or both.

An example of the heating element is illustrated in FIG. 1.

As illustrated in FIG. 1, heating element 10 includes heat generation layer 12 and electrodes 14. Heat generation layer 12 is a polyimide film containing the annealed stainless-steel fibers. Heat generation layer 12 has an endless-belt shape. Each electrode 14 is a ring composed of a metal thin plate. Each electrode 14 is disposed on the outer peripheral surface of each end portion of heat generation layer 12.

Heating element 10 is produced by the following method. First, a varnish of polyamic acid containing the annealed stainless-steel fibers is applied on the surface of a base (not illustrated) to produce a coating film of the varnish, and this coating film is dried and solidified. Next, the coating film is thermally cured (imidized) in a heating furnace having a temperature of 350 to 450° C. to obtain heat generation layer 12. Next, a conductive adhesive agent is applied at both ends of heat generation layer 12, and rings each composed of a metal thin plate are fitted and bonded on respective end portions of heat generation layer 12 to obtain electrodes 14.

Figure 2:
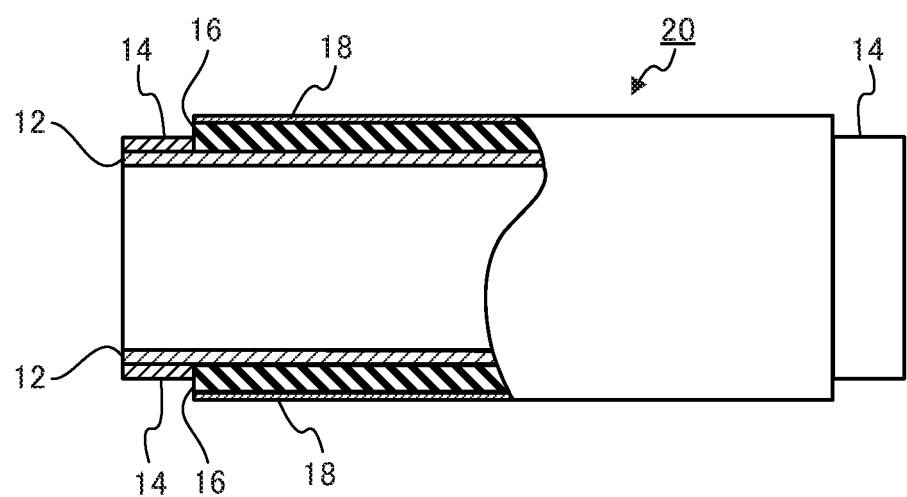
FIG. 2 schematically illustrates another example of the heating element according to the embodiment of the present invention.

Another example of the heating element is illustrated in FIG. 2.

As illustrated in FIG. 2, heating element 20 includes, in addition to heat generation layer 12 and electrode 14, elastic layer 16 disposed on the outer peripheral surface of heat generation layer 12, and releasing layer 18 disposed on the outer peripheral surface of elastic layer 16. As described above, elastic layer 16 is a silicone rubber layer, for example. Releasing layer 18 is a fluororesin layer, for example.

Heating element 20 is produced by applying a coating material of the silicone rubber material on the surface of heat generation layer 12, housing heat generation layer 12 in a fluororesin tube serving as releasing layer 18, and then curing the coating material to produce a silicone rubber layer (elastic layer 16) that bonds heat generation layer 12 and the tube together. The tube serves as releasing layer 18 disposed on elastic layer 16.

The heating element has a good dimensional stability, and the resistance value of the heating element is stabilized for a long period. The reasons for this are considered below.

In general, when a load such as a thermal load is applied to a heating element, the resistance value of the heating element may be changed because of dimensional change of the heating element due to heat. However, normally, dimensional changes due to the heat-resistant resin are not caused at a temperature of the heating element in operation. For this reason, it can be said that the dimensional change of the heating element is caused by deformation of the stainless-steel fibers by a temporal thermal load.

Specifically, in general, when processing such as cutting is performed on a metal, stress caused by the processing remains in the metal as strain. Such a stress is released by heating. A temperature environment of approximately 200° C. is required for a fixation process of an electrophotographic process, and when the heating element is applied on the fixation process, the stainless-steel fibers in which the stress remains are inevitably deformed in the article of the heat-resistant resin at the temperature. Consequently, the stainless-steel fibers in the article are deformed, thus changing the distances between the stainless-steel fibers in the article. Accordingly, it can be said that the resistance value of the heating element is thus changed.

In contrast, the heating element according to the present embodiment contains an article of the heat-resistant resin, and the annealed stainless-steel fibers dispersed in the article. That is, the heating element contains stainless-steel fibers in which the stress is removed before they are dispersed in the article. With this configuration, even when the heating element generates heat (for example, when it generates heat during the fixation process), deformation of the stainless-steel fibers is not caused, and therefore dimensional change of the heating element is not caused. Thus, in the heating element, its resistance value is not changed by heat generation.

As is obvious from the above descriptions, since the heating element contains the article comprising the heat-resistant resin and the annealed stainless-steel fibers dispersed in the heat-resistant resin, the annealed stainless-steel fiber having been subjected to the annealing treatment before the use of the heating element, the resistance value of the heating element is stabilized for a long period.

In addition, when the heating element satisfies the above-mentioned Expression (1), the above-described uneven fixing can be more effectively limited.

In addition, when the content of the annealed stainless-steel fibers in the heating element is 10 to 60 volume %, favorable mechanical and electrical properties of the heating element can be more effectively achieved.

In addition, when the volume resistivity of the heating element is $0.08 \times 10^{-4}$ to $10.00 \times 10^{-4}$ Ωcm, favorable heat generation as the heating belt can be more effectively achieved.

In addition, when the heating element satisfies the above-mentioned Expression (2), the uneven fixing can be more effectively limited when it is used as the heating belt.

In addition, the process for producing the heating element includes the steps of: dispersing the annealed stainless-steel fibers in the heat-resistant resin or their precursor; and producing a molded article of the heat-resistant resin in which the annealed stainless-steel fibers are dispersed, and thus can provide a heating element whose resistance value is stable for a long period.

[Heating Device]

A heating device according to the present embodiment includes: a sheet-shaped or endless-belt shaped heat generation member; a fixing roller disposed inside the heat generation member and configured to make contact with a part of the inner peripheral surface of the heat generation member; a pressure roller disposed outside the heat generation member and configured to press the outer peripheral surface of the heat generation member toward the fixing roller; and a power supply device configured to supply electricity to the heat generation member. The heat generation member is the sheet-shaped or endless-belt shaped heating element.

The heating device includes a sheet-shaped or endless-belt shaped heat generation section. The heating device is suitable for surface-heating. Examples of the use of the heating device include a fixing device of an electrophotographic image forming apparatus. In the following, a fixing device as an example of the heating device is described.

Figure 3A:
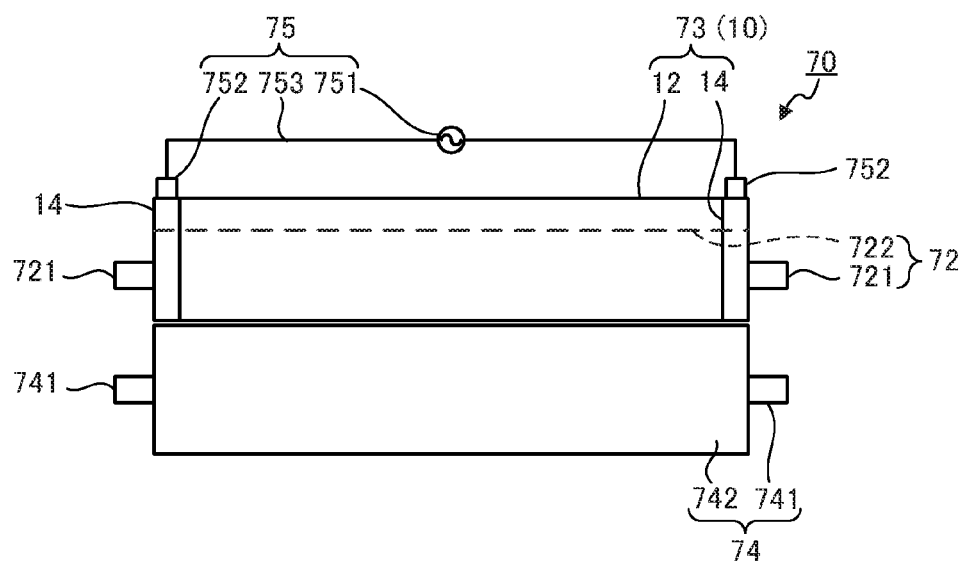
FIGS. 3A and 3B are a front view and a side view, respectively, each schematically illustrating a configuration of a fixing device serving as an example of a heating device according to the embodiment of the present invention.
Figure 3B:
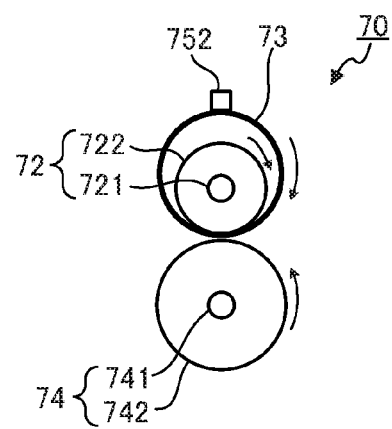

As illustrated in FIG. 3A and FIG. 3B, fixing device 70 includes fixing roller 72, heating belt 73, pressure roller 74 and power supply device 75. Heating belt 73 has an endless-belt shape. Heating belt 73 corresponds to the above-described heating element 10.

Fixing roller 72 includes mandrel 721 having a columnar shape and resin layer 722 disposed on the peripheral surface of mandrel 721. The outer diameter of resin layer 722 is smaller than the internal diameter of heating belt 73. Fixing roller 72 is disposed inside heating belt 73. Fixing roller 72 makes contact with a portion of the inner peripheral surface of heating belt 73 in the circumferential direction of heating belt 73.

Pressure roller 74 includes mandrel 741 having a columnar shape and resin layer 742 disposed on the peripheral surface of mandrel 741. Pressure roller 74 is disposed to face fixing roller 72 with heating belt 73 therebetween. Pressure roller 74 is disposed such that pressure roller 74 can press the outer peripheral surface of heating belt 73 toward fixing roller 72. Normally, pressure roller 74 is separated from heating belt 73.

Resin layers 722 and 742 are each a layer formed of publicly known resin or a layer formed by foaming of publicly known resin. Examples of the resins include silicone rubber and fluorine rubber. At least one of resin layers 722 and 742 has elasticity that allows the layer to be deformed when pressure roller 74 presses fixing roller 72.

Pressure roller 74 may further include on resin layer 742 a releasing layer having releasability to a recording medium such as a plain sheet and toner. An example of the material of the releasing layer includes fluororesin, and the releasing layer is formed by a fluorinated tube, a fluorinated coating or the like. The releasing layer has a thickness of 5 to 100 μm, for example.

Power supply device 75 includes alternating-current power source 751, power supply member 752 configured to make contact with electrode 14, and connecting wire 753 configured to connect alternating-current power source 751 and power supply member 752 together.

Power supply member 752 is biased toward electrode 14 by an elastic member (not illustrated) such as a leaf spring and a coil spring. Power supply member 752 may be a member that slides or rotates with respect to electrode 14. Examples of power supply member 752 include a carbon brush made of carbon material such as graphite or copper-graphite composite material.

Heating belt 73, fixing roller 72 and pressure roller 74 are rotatably provided. Each of heating belt 73, fixing roller 72 and pressure roller 74 may be rotatably provided, or one of them may be rotatably driven while the others following the rotation.

When pressure roller 74 presses the outer peripheral surface of heating belt 73 toward fixing roller 72, a contacting part (nip part) between heating belt 73 and pressure roller 74 is formed. The nip part may be configured by depression of fixing roller 72, or by depression of pressure roller 74.

Rotation of each roller and heating belt 73, supply of power to heating belt 73 and formation of the nip part at the time of fixation of a toner image may be performed as in publicly known fixing devices. As long as the effect of the present embodiment can be achieved, fixing device 70 may further include other configurations of publicly known fixing devices.

Since heating belt 73 is heating element 10, dimensional change of heating belt 73 can be suppressed even with the heat generated by fixing device 70 in operation, and the resistance value is not substantially changed. For example, when the heating element is caused to generate heat by electrification under a condition as a fixing device of an electrophotographic image forming apparatus, the temporal resistance change rate (dynamic resistance change rate described later) of the heating element can be limited to 5% or lower.

[Image Forming Apparatus]

The image forming apparatus according to the present embodiment includes a fixing device that fixes an unfixed toner image, which is formed on a recording medium by an electrophotographic process, onto the recording medium by heating and pressing, and the fixing device is the above-mentioned heating device. The image forming apparatus may have a configuration similar to that of a publicly known image forming apparatus except that the heating device is provided as the fixing device. In the following, an example of the image forming apparatus according to the present embodiment is described with reference to FIG. 4.

Image forming apparatus 50 includes an image forming section, an intermediate transfer section, fixing device 70, an image reading section and a recording medium conveyance section.

Figure 4:
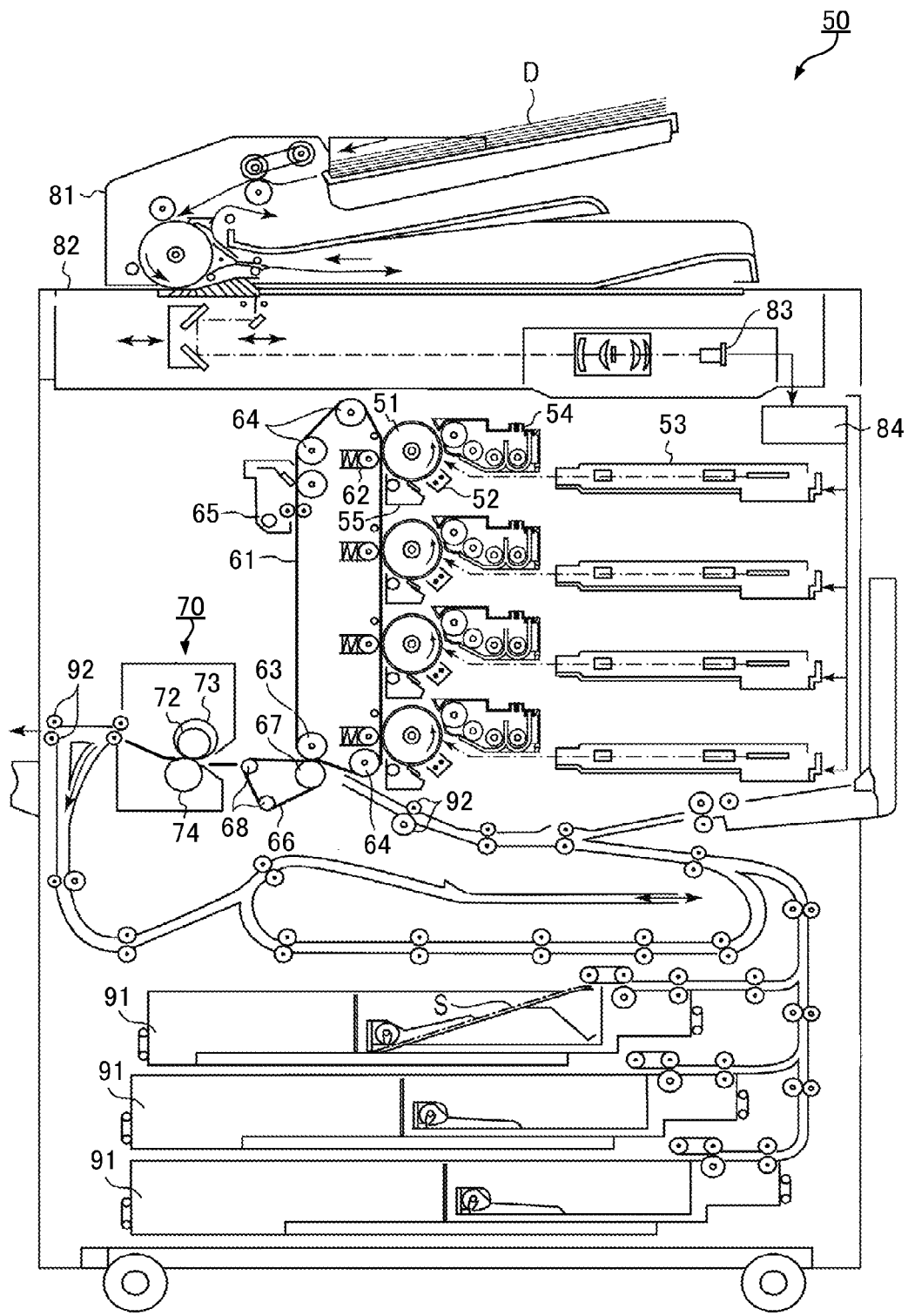
FIG. 4 schematically illustrates an exemplary configuration of an image forming apparatus according to the embodiment of the present invention.

The image forming section includes four image forming units corresponding to colors of yellow, magenta, cyan and black. As illustrated in FIG. 4, the image forming unit includes: photoconductor drum 51; charging device 52 configured to charge photoconductor drum 51; exposing device 53 configured to irradiate charged photoconductor drum 51 with light to form an electrostatic latent image; developing device 54 configured to supply toner to photoconductor drum 51 on which an electrostatic latent image is formed to form a toner image corresponding to the electrostatic latent image; and cleaning device 55 configured to remove residual toner on photoconductor drum 51.

Photoconductor drum 51 is a negative charge type organic photoconductor having photoconductivity, for example. Charging device 52 is a corona charger, for example. Charging device 52 may be a contacting charger that brought a contact charging member such as a charging roller, a charging brush, a charging blade into contact with photoconductor drum 51 for charging. Exposing device 53 is composed of a semiconductor laser, for example. Developing device 54 is a publicly known developing device in an electrophotographic image forming apparatus, for example. The "toner image" corresponds to a state where toner particles are combined to form an image.

The intermediate transfer section includes a primary transfer unit and a secondary transfer unit. The primary transfer unit includes intermediate transfer belt 61, primary transfer roller 62, backup roller 63, a plurality of support rollers 64 and cleaning device 65. Intermediate transfer belt 61 is an endless belt. Intermediate transfer belt 61 is installed in a stretched state in a loop form by backup roller 63 and support rollers 64. When at least one of backup roller 63 and support rollers 64 is driven to rotate, intermediate transfer belt 61 travels along an endless track in one direction, at a constant speed.

The secondary transfer unit includes secondary transfer belt 66, secondary transfer roller 67 and a plurality of support rollers 68. Secondary transfer belt 66 is also an endless belt. Secondary transfer belt 66 is installed in a stretched state in a loop form by secondary transfer roller 67 and support rollers 68.

For example, fixing device 70 is one illustrated in FIG. 3A and FIG. 3B. Sheet S corresponds to a recording medium.

The image reading section includes sheet feeding device 81, scanner 82, CCD sensor 83 and image processing section 84. The recording medium conveyance section includes three sheet feed tray units 91 and a plurality of registration roller pairs 92. Sheet feed tray unit 91 stores therein sheets S (such as standard paper and special paper) that are preliminarily discriminated and separated based on their basis weights and sizes. Registration roller pairs 92 are disposed in such a manner as to form a desired conveyance path.

Image forming apparatus 50 forms an image as follows.

Scanner 82 optically scans and reads document D on the contact glass that is sent from sheet feeding device 81. Light reflected from document D is read by CCD sensor 83 to be converted into input image data. The input image data is subjected to a predetermined image processing at image processing section 84, and sent to exposing device 53.

Meanwhile, photoconductor drum 51 rotates at a constant circumferential velocity. Charging device 52 evenly and negatively charges the surface of photoconductor drum 51. Exposing device 53 irradiates photoconductor drum 51 with laser beams corresponding to input image data of respective color components. Thus, an electrostatic latent image is formed on the surface of photoconductor drum 51. Developing device 54 attaches toner on the surface of photoconductor drum 51 to thereby visualize the electrostatic latent image. Thus a toner image corresponding to the electrostatic latent image is formed on the surface of photoconductor drum 51. The toner image on the surface of photoconductor drum 51 is transferred to intermediate transfer belt 61. The transfer residual toner of photoconductor drum 51 is removed by cleaning device 55. Color toner images formed on respective photoconductor drums 51 are sequentially transferred on one another to intermediate transfer belt 61.

Meanwhile, secondary transfer belt 66 is pushed by secondary transfer roller 67 toward backup roller 63, and thus brought into pressure contact with intermediate transfer belt 61. In this manner, a secondary transfer nip part is formed. In the meantime, sheet S is conveyed to the secondary transfer nip part from sheet feed tray unit 91 through registration roller pairs 92. Registration roller pairs 92 correct skew of sheet S and adjust the conveyance timing.

When sheet S is conveyed to the secondary transfer nip, a transfer voltage is applied to secondary transfer roller 67, and the toner image on intermediate transfer belt 61 is transferred to sheet S. Sheet S on which the toner image has been transferred is conveyed by secondary transfer belt 66 to fixing device 70. The transfer residual toner on intermediate transfer belt 61 is removed by cleaning device 65.

In fixing device 70, at the time of conveyance of sheet S, pressure roller 74 is biased toward fixing roller 72 and heating belt 73, and a fixing nip part is formed, for example. Heat and pressure are applied on sheet S at the fixing nip part, for example. Consequently, the toner image on sheet S is fixed on sheet S. Sheet S on which the toner image is formed is ejected out of the apparatus.

As described above, image forming apparatus 50 includes fixing device 70. This prevents fixation problems such as uneven fixing associated with dimensional change of heating belt 73 for a long period of time in fixing device 70. Accordingly, image forming apparatus 50 can stably form high quality images for a long period of time.

As is obvious from the above descriptions, the present embodiment can provide a heating element whose resistance value is stable for a long period of time, and can provide an image forming apparatus which can suppress the occurrence of uneven fixing.

EXAMPLES

The present invention will be described in detail based on examples and comparative examples. In the following, unless otherwise noted, operations are conducted at room temperature (25° C.). It is to be noted that the present invention is not limited to the following Examples and so forth.

Example 1

First, annealed stainless-steel fibers are prepared. The annealed stainless-steel fibers are fibers of SUS430, each of the fibers having a minor axis of 8 μm, a major axis of 35 μm, an aspect ratio (minor axis/major axis) of 0.229, and the annealing treatment is conducted under a condition of a nitrogen atmosphere, treatment time of 10 hours, and a treatment temperature of 500° C.

12 g of annealed stainless-steel fibers are put in a 100 g of a polyamic acid solution (Ube Industries, Ltd. U-varnish S301, solvent: N-methyl-2-pyrrolidone) which is a polyimide resin precursor, and mixed with a rotation-revolution disperser for agitation and defoaming to prepare a polyamic acid dope liquid.

The polyamic acid dope liquid is cylindrically applied on the outer peripheral surface of a cylindrical metal mold by spiral application such that the film obtained by baking has a thickness of 100 μm to form a coating film of the dope liquid, and the coating film is dried at 120° C. for 60 minutes. Thereafter, the coating film is baked at 450° C. for 20 minutes and thus a cylindrical conductive belt is produced. The content of the annealed stainless-steel fibers in the conductive belt is 20 volume %.

Thereafter, one turn of a conductive tape CU-35C (available from 3M), which has a width of 10 mm and a thickness of 2 mm and serves as the electrode, is bonded on the outer peripheral surface of each of the both end portions of the conductive belt and thus heating element 1 is produced. The distance between the conductive tapes (the distance between their edges nearer to each other) is 300 mm.

[Evaluation]

Dimensional change DL of heating element 1 is 0.0001. From the following expression, the dimensional change DL is determined by measuring, with a vernier caliper, distance L0 between the electrodes of heating element 1 before heating element 1 is left under a high temperature environment and distance L1 between the electrodes after heating element 1 is left under a high temperature environment for one week. The high temperature environment is an environment of 200° C. and 50RH %.

$$DL=|(L1-L0)/L0|$$

In addition, heating element 1 has a volume resistivity $\rho$ of $0.10 \times 10^{-5}$ $\Omega$cm. The volume resistivity is determined from the following expression:

volume resistivity $\rho(\Omega cm)=(R \times d \times W)/L$ where R represents a resistance value when a voltage is applied to the electrodes at both ends of heating element 1 and measured using a resistance tester (LORESTA GP, Mitsubishi Chemical Analytech Co., Ltd), d is a thickness (cm) of heating element 1, W represents a length (cm) of heating element 1 in the circumferential direction, and L represents a distance between the electrodes of heating element 1.

In addition, resistance change rate (static resistance change rate) $\rho s$ of heating element 1 under a high temperature environment is 1.03. The static resistance change rate $\rho s$ is determined as the ratio $\rho s1/\rho s0$, that is, a ratio of volume resistivity $\rho s1$ of heating element 1 after it is left under the high temperature environment for one week, to volume resistivity $\rho s0$ (the above-mentioned $\rho$) of heating element 1 before it is left under the high temperature environment. The high temperature environment is an environment of 180° C. and 50RH %.

In addition, resistance change rate (dynamic resistance change rate) $\rho d$ under a condition of electrification heat generation of heating element 1 is 5% or lower. The dynamic resistance change rate is determined from the following expression by measuring volume resistivity $\rho d0$ (the above-mentioned $\rho$) of heating element 1 before electrification, and volume resistivity $\rho d1$ of heating element 1 after electrification. The electrification is conducted in an electrification cycle corresponding to the image formation for 600,000 A4-sheets, and one cycle of the electrification cycle involves electrification between the electrodes of heating element 1 for one minute and suspension of the electrification for one minute. In addition, the temperature of heating element 1 is maintained at 180° C. by the electrification.

$$\rho d(\%)=|\{(\rho d1-\rho d0)/\rho d0\}| \times 100$$

It is to be noted that the result of the measurement in heating element 1 is an average value of measured values at five points which are obtained from single heating element 1 or a plurality of heating elements 1.

In addition, heating element 1 after the measurement of the dynamic resistance change rate is installed as a fixing belt in an image forming apparatus such as that illustrated in FIG. 4, and red solid images (R solid images) are formed on 600,000 recording media, and then, solid images of every 10,000 recording media are visually observed to evaluate presence/absence of uneven fixing based on the following criteria. It is to be noted that the "uneven fixing" is a portion where toner fixation defect is observed, and when the maximum length of the portion is 1 mm or longer, it is determined that "uneven fixing is clearly found." The evaluation on heating element 1 for uneven fixing is "A."

A: Uneven fixing is not found
B: Uneven fixing is clearly found

Example 2 and Comparative Example 1

Heating element 2 is produced in the same manner as in Example 1 except that the temperature at which the stainless-steel fibers are annealed is changed to 550° C. In addition, heating element C1 is produced in the same manner as in Example 1 except that stainless-steel fibers which are not subjected to the annealing treatment are used.

Comparative Examples 2 to 4

Heating element C1 produced in the manner is subjected to thermal treatment in the same condition of annealing treatment as that of Example 1 except that treatment temperature is 400° C. to thereby produce heating element C2. In addition, in the same manner as that for heating element C2 except that the treatment temperature is changed to 450° C., heating element C3 is produced. Further, in the same manner as that for heating element C2 except that the treatment temperature is changed to 500° C., heating element C4 is produced.

Heating elements 2 and C1 to C4 are measured and evaluated in the same manner as that for heating element 1. Results of the measurement and evaluation on heating elements 1, 2 and C1 to C4 are shown in table 1.

TABLE 1

| Resistance heater | Annealing treatment | | DL (—) | $\rho$ ($\Omega \cdot cm$) | $\rho s$ (—) | $\rho d$ (%) | Uneven fixing |
|---|---|---|---|---|---|---|---|
| | Timing | Temperature (° C.) | | | | | |
| 1 | Before mixing | 500 | 0.0001 | $1.0 \times 10^{-5}$ | 1.03 | ≤5 | A |
| 2 | Before mixing | 550 | 0.00008 | $1.0 \times 10^{-5}$ | 1.02 | ≤5 | A |
| C1 | — | — | 0.0010 | $1.0 \times 10^{-5}$ | 1.10 | >10 | B |
| C2 | After formation | 400 | 0.0008 | $1.0 \times 10^{-5}$ | 1.09 | >10 | B |
| C3 | After formation | 450 | 0.0006 | $1.0 \times 10^{-5}$ | 1.08 | >10 | B |
| C4 | After formation | 500 | 0.0006 | $1.0 \times 10^{-5}$ | 1.05 | >10 | B |

As is obvious from the above descriptions, heating elements 1 and 2 having the annealed stainless-steel fibers are both have desired heat generation characteristics, and are excellent in dimensional stability.

In contrast, although heating elements C1 to C4 each have desired heat generation characteristics, they are inferior to heating elements 1 and 2 in dimensional stability. In heating elements C1 to C4, although dimensional change is slightly caused when they are heated as heating elements, they cause uneven fixing in the image forming apparatus. One possible reason for the uneven fixing is that the resistance value of the entire heating element is changed due to the dimensional change of the heating element.

From the results, one possible reason for the dimensional change of the heating element is the dimensional change of the stainless-steel fibers. Specifically, in the annealed stainless-steel fibers, the internal strain of the fibers which is left by processing is removed. Meanwhile, in the stainless-steel fibers which are not subjected to annealing treatment, the internal strain still remains, and the dimensional change of the heating element is caused by the presence of the internal strain.

In addition, when the stainless-steel fibers are in polyimide, the internal strain cannot be sufficiently removed even when heating is conducted under an effective condition of annealing treatment. For example, it can be said from dimensional change DL shown in Table 1 that heat treatment on heating elements C2 to C4 conducted after formation does not substantially alter the physical property of polyimide, and it can be said from resistance change rates $\rho s$ and $\rho d$ shown in Table 1 that the treatment is insufficient to sufficiently reduce the resistance change rate.

INDUSTRIAL APPLICABILITY

According to the present invention, it is possible to provide an image forming apparatus in which uneven fixing is not caused by dimensional change of the heating belt. Therefore, according to the present invention, it is possible to expect enhancement in performance and power saving in an electrophotographic image forming apparatus, and further popularization of the image forming apparatus.

What is claimed is:

1. A method for producing a heating element containing a heat-resistant resin and stainless-steel fibers dispersed in the heat-resistant resin, comprising:
    subjecting stainless steel fibers to an annealing treatment by heating the stainless-steel fibers to a temperature of 500 to 600° C. to form annealed stainless-steel fibers,
    dispersing the annealed stainless-steel fibers in the heat-resistant resin or a precursor thereof, and
    producing a molded article of the heat-resistant resin in which the annealed stainless-steel fibers are dispersed,
    wherein a dimensional change of the heating element satisfies Expression (1)

$$\{(L1-L0)/L0\} \leq |0.0002| \tag{1}$$

where L0 represents an initial dimension of the heating element before being left under an environment of 200° C., and L1 represents a dimension of the heating element after being left under an environment of 200° C. for one week.

2. The method for producing a heating element according to claim 1, wherein the heating element comprises 10 to 60 volume percent of the annealed stainless-steel fibers.

3. The method for producing a heating element according to claim 1, wherein the heating element has a volume resistivity of $0.08 \times 10^{-4}$ to $10.00 \times 10^{-4}$ $\Omega$cm.

4. The method for producing a heating element according to claim 1, wherein a resistance change rate of the heating element satisfies Expression (2):

$$1 \leq (\rho s1/\rho s0) \leq 1.03 \tag{2}$$

where $\rho s0$ represents an initial resistance value ($\Omega$) of the heating element before being left under an environment of 180° C. and 50RH %, and $\rho s1$ represents a resistance value ($\Omega$) of the heating element after being left under an environment of 180° C. and 50RH % for one week.

5. The method for producing a heating element according to claim 1, wherein the ratio of the minor axis to the major axis of the stainless-steel fibers is 0.25 or smaller, the major axis of the stainless-steel fibers is 5 to 1000 μm, and the minor axis of the stainless-steel fibers is 0.5 to 30 μm.

6. The method for producing a heating element according to claim 1, wherein an oxidation-preventing coating is produced on the stainless-steel fibers.

7. A method for producing a heating element containing a heat-resistant resin and stainless-steel fibers dispersed in the heat-resistant resin, comprising:

subjecting stainless steel fibers to an annealing treatment by heating the stainless-steel fibers to a temperature of 500 to 600° C. to form annealed stainless-steel fibers, dispersing the annealed stainless-steel fibers in the heat-resistant resin or a precursor thereof, and producing a molded article of the heat-resistant resin in which the annealed stainless-steel fibers are dispersed, wherein a resistance change rate of the heating element satisfies Expression (2):

$$1 \leq (\rho s1/\rho s0) \leq 1.03 \quad (2)$$

where $\rho s0$ represents an initial resistance value ($\Omega$) of the heating element before being left under an environment of 180° C. and 50RH %, and $\rho s1$ represents a resistance value ($\Omega$) of the heating element after being left under an environment of 180° C. and 50RH % for one week.

8. The method for producing a heating element according to claim 7, wherein the heating element comprises 10 to 60 volume percent of the annealed stainless-steel fibers.

9. The method for producing a heating element according to claim 7, wherein the heating element has a volume resistivity of $0.08 \times 10^{-4}$ to $10.00 \times 10^{-4}$ $\Omega$cm.

10. The method for producing a heating element according to claim 7, wherein the ratio of the minor axis to the major axis of the stainless-steel fibers is 0.25 or smaller, the major axis of the stainless-steel fibers is 5 to 1000 μm, and the minor axis of the stainless-steel fibers is 0.5 to 30 μm.

11. The method for producing a heating element according to claim 7, wherein an oxidation-preventing coating is produced on the stainless-steel fibers.

12. A method for producing a heating element containing a heat-resistant resin and stainless-steel fibers dispersed in the heat-resistant resin, comprising:

subjecting stainless steel fibers to an annealing treatment by heating the stainless-steel fibers to a temperature of 500 to 600° C. to form annealed stainless-steel fibers, wherein the heating step of the annealing treatment is performed for 4 to 10 hours, dispersing the annealed stainless-steel fibers in the heat-resistant resin or a precursor thereof, and producing a molded article of the heat-resistant resin in which the annealed stainless-steel fibers are dispersed.

13. The method for producing a heating element according to claim 12, wherein the heating element comprises 10 to 60 volume percent of the annealed stainless-steel fibers.

14. The method for producing a heating element according to claim 12, wherein the heating element has a volume resistivity of $0.08 \times 10^{-4}$ to $10.00 \times 10^{-4}$ $\Omega$cm.

15. The method for producing a heating element according to claim 12, wherein the ratio of the minor axis to the major axis of the stainless-steel fibers is 0.25 or smaller, the major axis of the stainless-steel fibers is 5 to 1000 μm, and the minor axis of the stainless-steel fibers is 0.5 to 30 μm.

16. The method for producing a heating element according to claim 12, wherein an oxidation-preventing coating is produced on the stainless-steel fibers.

17. A method for producing a heating element containing a heat-resistant resin and stainless-steel fibers dispersed in the heat-resistant resin, comprising:

subjecting stainless steel fibers to an annealing treatment by heating the stainless-steel fibers to a temperature of 500 to 600° C. to form annealed stainless-steel fibers, producing an oxidation-preventing coating on the stainless-steel fibers, the oxidation-preventing coating being a film that comprises an oxide of at least one of Cr, Mo, Cu, and Si, or a composite oxide of Cr, Mo, Cu, and Si, dispersing the annealed stainless-steel fibers in the heat-resistant resin or a precursor thereof, and producing a molded article of the heat-resistant resin in which the annealed stainless-steel fibers are dispersed.

18. The method for producing a heating element according to claim 17, wherein the heating element comprises 10 to 60 volume percent of the annealed stainless-steel fibers.

19. The method for producing a heating element according to claim 17, wherein the heating element has a volume resistivity of $0.08 \times 10^{-4}$ to $10.00 \times 10^{-4}$ $\Omega$cm.

20. The method for producing a heating element according to claim 17, wherein the ratio of the minor axis to the major axis of the stainless-steel fibers is 0.25 or smaller, the major axis of the stainless-steel fibers is 5 to 1000 μm, and the minor axis of the stainless-steel fibers is 0.5 to 30 μm.

* * * * *